United States Patent Office

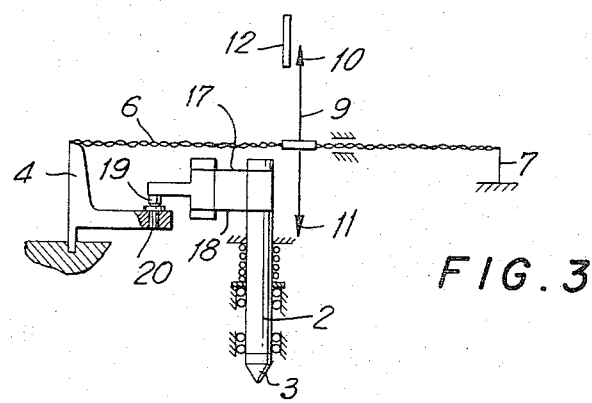
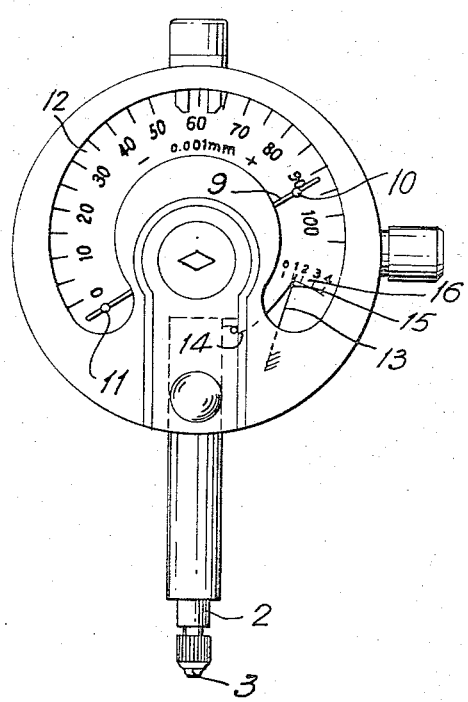
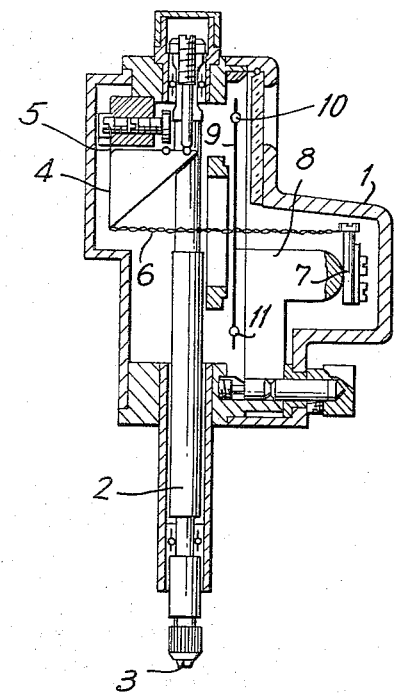

3,337,963
Patented Aug. 29, 1967

1

3,337,963
SPRING-TYPE MEASURING HEAD
Yakov Mikhailovich Tseitlin, Novocherkassky pr. 32/15, kv. 308; Anatoly Andreevich Sokolov, Zanevsky pr. 20, kv. 62; and Ivan Sergeevich Amosov, Politekhnicheskaya ulitsa 3, kv. 99, all of Leningrad, U.S.S.R.
Filed Sept. 3, 1965, Ser. No. 484,840
3 Claims. (Cl. 33—172)

This invention relates to high precision mechanical means for measuring the shape and dimensions of surfaces, and more particuluarly, to spring-type measuring heads, e.g., microcators, minicators, opticators, and other instruments in which the sensing element is a twisted band spring supporting an indicating means, e.g., a pointer.

The twisted spring is kinematically coupled to a feeler rod which reciprocates when coming in contact with the measured surface. As the feeler rod moves, the tension of the twisted spring varies and the pointer indicates the amount of this motion in terms of the pointer angular deflection against the scale.

Instruments of this kind ensure high precision of measurements and therefore have found extensive use in measuring techniques.

These instruments, however, possess a substantial disadvantage, namely, an insufficient control range, primarily due to the necessity of fixing one of the spring ends in front of the angle reading scale on a special bracket, which limits the readings within a range less than one complete turn of the pointer.

Spring-type measuring heads (microcators) have been proposed in which, in order to increase the control range of the instruments, the pointer is elongated and the intervals between the scale divsions decreased. But this results in an increase in the instrument dimensions and in the pointer weight, which reduces the vibration resistance and makes the reading of the instrument indications difficult.

Moreover, these measures do not allow an increase in the instrument control range by more than 2–2.5 times.

It is an object of this invention to provide a spring-type measuring head having a sufficiently wide range of measurement.

Another object of the invention is to provide a measuring head featuring a wide control range and yet having small size and a scale convenient for taking readings.

Still another object of this invention is to provide a measuring head whose error of accuracy over the entire range of measurements is not more than 1–1.5%.

The primary object of this invention is to provide a multiturn measuring head having a twisted band spring and enabling the readings to be taken in any position of the pointer.

To solve the above problem, the measuring head according to the invention is provided with a counter of half-turns of the reading pointer which is secured at its middle portion to the twisted spring, the extreme ends serving the purpose of reading.

The counter of the pointer half-turns is preferably a flat spring having two blades joined at one end, one of the free ends of one blade being fixed, while the free end of the other blade is connected with the feeler rod.

The angle reading scale is located in the zone of movement of joined ends of the pointer blades. For convenience of reading the tips of the reading and half-turn pointers may be different colors, and the scales of the measuring head and the counter of the pointer half-turns calibrated in respective colors.

The detailed description of the invention which follows hereinafter will be described with reference to the accompanying drawings in which:

2

FIG. 1 is a front view of the measuring head according to the invention;

FIG. 2 is a side elevation of the measuring head in section;

FIG. 3 is an embodiment of the measuring head with a kinematic resilient compensation in the transmission system from the feeler rod to the twisted band.

In housing 1 (FIGS. 1 and 2) of the measuring head there is installed a movable feeler rod 2, whose tip 3 comes in contact with the object to be measured. The upper portion of the rod 2 interacts with the end of an angular transmission lever 4 which can turn on the flat spring 5.

To the other end of lever 4 is secured a sensing element, i.e., twisted band spring 6, tensioned between said lever and a resilient support 7 mounted on bracket 8.

The spring 6 supports a reading pointer 9, secured to the spring by its middle portion and having two diametrically opposed indicators 10 and 11 which may be painted different colors, say, red and black. Pointer ends of different shape can also be used.

Reading pointer 9 is located exactly in accordance with the diameter of an angle reading scale 12 which is located in the housing 1 perpendicular to the spring 6. For the sake of convenience the scale 12 can be calibrated in corresponding colors with the pointer ends (red and black). To distinguish the pointer ends they may vary in length, and, correspondingly, scale 12 should be made as two scales, located concentrically at different distances from the center of the pointer rotation corresponding to the lengths of the pointer ends.

Movement of the feeler rod 2 is transmitted through lever 4 to the end of the twisted spring 6, whose tension is changed thus causing the reading pointer 9 to turn relative to scale 12 through an angle corresponding to the value of the movement of feeler rod 2.

To take readings from scale 12 within one turn of the pointer, the reading of the first half-turn is taken from one of the pointer tip indications on the corresponding scale, while the readings of the second half-turn are taken from the other pointer tip indications on the scale corresponding thereto.

For the sake of reading convenience the measuring head is provided with a counter of the pointer half-turns. A resilient system of a single or twin blade spring can be used as such counter.

The counter of the pointer half-turns shown in the drawings is constituted as a twin-blade flat spring, the free end of blade 13 being rigidly secured to housing 1, while the free end of blade 14 is connected with feeler rod 2.

As feeler rod 2 is moved, the joined ends 15 of the blades 13 and 14 of the spring is moved relative to scale 16 from which the number of the pointer half-turns is read. The scale 16 can be be made with a two-color graduation corresponding to that of the ends of the indicators 10 and 11 to designate which of the ends is to be read.

The instrument proposed herein allows measuring linear parameters within a wide range through several complete turns of the pointer.

It should be understood also that instead of a reading pointer of the described type, another well known kind of the indicating element i.e. a mirror can be used, which in this case should be of dual type having two reflecting planes positioned at a certain angle with respect to each other.

To provide a multi-turn spring-type measuring head having a sufficiently wide range of measurments and relatively small value of the scale division, a reducing gear is inserted between feeler rod 2 and angular lever 4. A spring-type parallelogram with two flat parallel springs 17 and 18 can be used as such reducing gear (FIG. 3).

The parallelogram bears a flat contact journal 19 interacting with a spherical end piece 20 of lever 4.

The load on the measuring instrument is thus reduced.

What is claimed is:

1. A spring-type measuring head comprising: a housing; a feeler rod slidably mounted within said housing and capable of performing linear movements as a result of its cooperation with the object to be measured; a twisted spring band having opposite ends, one of which is secured within said housing; intermediate transmission means operatively connected with the other of the ends of said twisted band and with said feeler rod such that displacement of the feeler rod produces corresponding change in the tension of said band; an angular scale within said housing disposed in a plane normal to said twisted band; a first reading pointer for undergoing angular displacement relative to said angular scale for more than one revolution, said reading pointer having two diametrically opposed ends, said ends being a coded scale indicator, said pointer having a mid-portion connected to said twisted band to undergo turning relative to said angular scale during movement of said feeler rod and the consequent changes in the tension of said twisted band; a second pointer in operative engagement with said feeler rod and having an indicator end which undergoes movement in relation to the movement of the feeler rod, and scale means cooperating with the indicator end of the second pointer for indicating the number of half-turns made by said reading pointer during the movement of the feeler rod, said scale means including coding means related to the coded ends of the reading pointer for identifying which indicator end of said reading pointer is to be used to take a reading.

2. A measuring head as claimed in claim 1 wherein said ends of said first pointer have different colors, the coding means of said scale means comprising a scale having two-color calibration corresponding to that of the ends of said first pointer to designate which of the ends is to be read on the angular scale.

3. A measuring head as claimed in claim 2 wherein said second pointer comprises a spring having two blades jointed at adjacent ends, one of the blades having a free end fixed within said housing, the other blade having a free end operatively coupled with said feeler rod; the joined ends of the blades moving relative to said scale means to indicate the number of half-turns made by the reading pointer and to designate which of the ends of said first pointer is to be read on said angular scale.

References Cited

UNITED STATES PATENTS

| 1,702,455 | 2/1929 | Trumpler | 33—172 |
| 1,945,796 | 2/1934 | Ames | 33—172 |
| 2,585,565 | 2/1952 | Luck. | |
| 2,900,732 | 8/1959 | Abramson | 33—172 |

FOREIGN PATENTS

| 937,619 | 3/1948 | France. |
| 83,896 | 4/1919 | Switzerland. |
| 365,881 | 1/1963 | Switzerland. |

LEONARD FORMAN, *Primary Examiner.*

JOEL M. FREED, *Assistant Examiner.*